No. 756,975. Patented April 12, 1904.

UNITED STATES PATENT OFFICE.

ARMAND MULLER-JACOBS, OF RICHMOND HILL, NEW YORK, ASSIGNOR TO COSMOS CHEMICAL COMPANY, A CORPORATION OF NEW YORK.

VARNISH.

SPECIFICATION forming part of Letters Patent No. 756,975, dated April 12, 1904.

Application filed July 2, 1903. Serial No. 164,004. (No specimens.)

*To all whom it may concern:*

Be it known that I, ARMAND MULLER-JACOBS, a citizen of the Swiss Republic, and a resident of Richmond Hill, county of Queens, and State of New York, have invented certain new and useful Improvements in Varnishes, of which the following is a specification.

This invention relates to improvements in varnishes.

It consists in the addition of certain organic substances known under the name of "amid" in small proportions to resinous substances or the already-manufactured varnishes and by so doing changing their physical nature.

The amids which I use are of the higher fatty acids—as, for instance, of stearic acid—viz., stear-amid. I also may use such amids with alkyl groups, as the methylated or ethylated amids. In place of such amids I may use the analogous combinations with aromatic bases—as, for instance, stear-anilid. The amids, as well as their corresponding anilids of the higher fatty acids, are chemicals of high melting-points, being insoluble in cold or boiling water and sparingly soluble in cold alcohol, ether, chloroform, bisulfid of carbon, benzole, benzene, spirits of turpentine, and essential oils, &c., but are readily soluble in all these solvents when heated. They are also soluble in rosin when melted and in resinous gums.

By dissolving stear-amid in a mineral oil of low specific gravity, in turpentine or benzene varnish, or the like the new mixture acquires new properties, which consist in being more resistant to the influence of air, moisture, and light, overcoming its brittleness, and at the same time gaining in gloss and hardness in consequence of the high melting-point of the amids in general and of the corresponding anlids. I may prepare the rosins and gums—as, for instance, common rosin, dammar, sandarac, amber, copal, &c.—with a given proportion of the amid by melting them together, and thus obtain new commercial products which can be used to great advantage instead of the ordinary products of this kind as now known.

In carrying out my invention, first, I dissolve one hundred parts of rosin and three parts of stear-amid in two hundred parts of boiled linseed-oil at a proper temperature, and this I may dilute with spirits of turpentine, benzole, benzene, or the like in order to obtain a varnish for special purposes, such varnish having a much better drying and lasting quality, owing solely to the addition of the amid; second, I take a common oil-varnish as found in the market and dissolve in it from one-half per cent. to two per cent. of stear-amid or the like at the proper temperature, the resultant product of which will always be a varnish of superior quality; third, I take a hundred parts of rosin and add to it at its melting-point from one to five per cent. or more of stear-amid or the like, thereby producing a new article which can be used advantageously in place of common rosin for all varnish purposes.

By melting copal an addition of five to ten per cent. of the amid will render it more easily soluble in solvents, such as linseed-oil, &c., than before.

A solution of stear-amid in alcohol, benzene, benzole, spirits of turpentine, or the like being in itself a solution which, after application, for instance, on wood and other fibrous substances which may absorb it, will protect it against atmospheric influences and may therefore be used as a coating for such purposes.

What I claim as my invention is—

1. The combination of stear-amid with varnish.

2. The combination of stear-amid with varnish solutions.

3. The combination of solutions of stear-amid and varnish elements.

4. The combination of solutions of an amid of the higher fatty acids in which some of the hydrogen has been replaced by an alkyl radical and varnish elements.

Signed at New York this 27th day of June, 1903.

ARMAND MULLER-JACOBS.

Witnesses:
   A. P. THAYER,
   J. M. HOWARD.